(12) United States Patent
Lee et al.

(10) Patent No.: US 10,827,391 B2
(45) Date of Patent: Nov. 3, 2020

(54) METHOD AND DEVICE FOR CONNECTING SUBSTITUTE COMMUNICATION MEANS BY USING BLUETOOTH LOW ENERGY (LE) TECHNIQUE

(71) Applicant: LG ELECTRONICS INC., Seoul (KR)

(72) Inventors: Hyeonjae Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 15/747,693

(22) PCT Filed: Oct. 29, 2015

(86) PCT No.: PCT/KR2015/011487
§ 371 (c)(1),
(2) Date: Jan. 25, 2018

(87) PCT Pub. No.: WO2017/018604
PCT Pub. Date: Feb. 2, 2017

(65) Prior Publication Data
US 2018/0220335 A1 Aug. 2, 2018

Related U.S. Application Data

(60) Provisional application No. 62/197,087, filed on Jul. 26, 2015.

(51) Int. Cl.
*H04W 4/80* (2018.01)
*H04W 76/14* (2018.01)
(Continued)

(52) U.S. Cl.
CPC .......... *H04W 36/0011* (2013.01); *H04W 4/80* (2018.02); *H04W 8/005* (2013.01);
(Continued)

(58) Field of Classification Search
CPC ... H04W 36/0011; H04W 36/14; H04W 4/80; H04W 52/0209; H04W 52/0229;
(Continued)

(56) References Cited

U.S. PATENT DOCUMENTS

| 2014/0323048 A1* | 10/2014 | Kang | H04W 4/80 455/41.2 |
| 2014/0342670 A1* | 11/2014 | Kang | H04W 24/08 455/41.2 |
| 2015/0350334 A1* | 12/2015 | Liu | H04L 67/141 709/227 |

FOREIGN PATENT DOCUMENTS

| KR | 10-2009-0009228 A | 1/2009 |
| KR | 10-1355058 B1 | 1/2014 |

(Continued)

*Primary Examiner* — Andrew Lai
*Assistant Examiner* — M Mostazir Rahman
(74) *Attorney, Agent, or Firm* — Birch, Stewart, Kolasch & Birch, LLP

(57) ABSTRACT

The present invention relates to a method and a device for forming a substitute communication means by using Bluetooth low energy (LE). According to the present invention, provided are the method and the device, the method comprising the steps of: receiving an advertising message including substitute communication means information and service information from a second device, wherein the substitute communication means information includes information of a substitute communication means supported by the second device, and the service information includes information of at least one service, which can be provided by the second device through the substitute communication means; transmitting, to the second device, a filling out request message for requesting the activation of the substitute communication means and the at least one service; and receiving a response message as a response to the filling out request message.

16 Claims, 19 Drawing Sheets

(51) Int. Cl.
*H04W 36/00* (2009.01)
*H04W 52/02* (2009.01)
*H04W 8/00* (2009.01)
*H04W 88/06* (2009.01)
*H04W 36/14* (2009.01)
*H04W 8/24* (2009.01)
*H04W 84/18* (2009.01)

(52) U.S. Cl.
CPC ....... *H04W 52/0229* (2013.01); *H04W 76/14* (2018.02); *H04W 8/24* (2013.01); *H04W 36/14* (2013.01); *H04W 52/0209* (2013.01); *H04W 84/18* (2013.01); *H04W 88/06* (2013.01); Y02D 70/10 (2018.01); Y02D 70/14 (2018.01); Y02D 70/142 (2018.01); Y02D 70/144 (2018.01); Y02D 70/166 (2018.01)

(58) Field of Classification Search
CPC ..... H04W 76/10; H04W 76/14; H04W 84/18; H04W 88/06; H04W 8/005; H04W 8/24; Y02D 70/10; Y02D 70/14; Y02D 70/142; Y02D 70/144; Y02D 70/166
See application file for complete search history.

(56) References Cited

FOREIGN PATENT DOCUMENTS

| | | |
|---|---|---|
| KR | 10-2014-0131216 A | 11/2014 |
| KR | 10-2014-0146362 A | 12/2014 |
| WO | WO 2015/068988 A1 | 5/2015 |

* cited by examiner

Bluetooth BR /EDR

FIG. 11

| Sample | Length(1octet) | AD type(1octet) | AD data(9octets) |
|---|---|---|---|
| Sample | 0x0A | 0x2A(TBD) | Below table |
| Description | 10 octets | <<Service Discovery Data>> | Organization Frame |

| | Additional Carriers(1octet) | AD data(9octets) |
|---|---|---|
| Sample | (msb)0b00000001 (lsb)→0x01 | Below table |
| Description | Bluetooth SIG carrier exists(Bit0:1)<br>Wi-Fi Alliance carrier exists(Bit1:0)<br>RFU(Bit2-6:0...0)<br>Supported carrier Filed follows(Bit7:0) | Organization Frame |

| | Organization ID (1octet) | SDS Flags(1octet) | Length(1octet) | SDS Flags(1octet) |
|---|---|---|---|---|
| Sample | 0x01 | (msb)0b00000001 (lsb)→0x29 | 0x05 | 0b ...00000101<br>(TBD)→0x00000005 (4octets) | 0x05 (TBD) |
| Description | Bluetooth SIG:0x01 | Provider(Bits0-1:0b01)<br>Scanning Disabled(Bit:2:0)<br>Additional Data in GATT(Bit3:1)<br>On and TU(Bit4-5:0b10)<br>RFU(Bit6-7:0b00) | Length 5 octets | BR/EDR Profile Selector<br>In this example, below 2<br>are available<br>- A2DP<br>- Headset Profile | Hint of DU<br>5 sec<br>(Only if<br>On and TU) |

Advertising PDU

FIG. 12a

| Profile | Specification | Version | Status | UUID |
|---|---|---|---|---|
| 3DSP | 3D Synchronization Profile | 1.0 | Deprecated | 0x1139 |
| 3DSP | 3D Synchronization Profile | 1.0.1 | Active | 0x1139 |
| A2DP | Advanced Audio Distribution Profile | 1.0 | Active | 0x110D |
| A2DP | Advanced Audio Distribution Profile | 1.2 | Active | 0x110D |
| A2DP | Advanced Audio Distribution Profile | 1.3 | Active | 0x110D |
| AVRCP | A/V Remote Control Profile | 1.0 | Active | 0x110F |
| AVRCP | A/V Remote Control Profile | 1.3 | Active | 0x110F |
| AVRCP | A/V Remote Control Profile | 1.4 | Deprecated | 0x110F |
| AVRCP | A/V Remote Control Profile | 1.5 | Active | 0x110F |
| AVRCP | A/V Remote Control Profile | 1.6 | Active | 0x110F |
| BIP | Basic Imaging Profile | 1.0 | Active | 0x111A |
| BIP | Basic Imaging Profile | 1.1 | Deprecated | 0x111A |
| BIP | Basic Imaging Profile | 1.2 | Active | 0x111A |
| BPP | Basic Printing Profile | 1.0 | Active | 0x1122 |
| BPP | Basic Printing Profile | 1.2 | Active | 0x1122 |
| CNT | Calendar, Task, and Notes Profile | 1.0 | Active | 0x113E |
| DI | Device ID Profile | 1.2 | Active | 0x1200 |
| DI | Device ID Profile | 1.3 | Active | 0x1200 |
| DUN | Dial-Up Networking Profile | 1.1 | Active | 0x1103 |
| DUN | Dial-Up Networking Profile | 1.2 | Active | 0x1103 |
| FTP | File Transfer Profile | 1.1 | Active | 0x1106 |
| GAVDP | Generic A/V Distribution Profile | 1.3 | Active | |
| GNSS | Global Navigation Satellite System Profile | 1.0 | Active | 0x1135 |

BR/EDR Service List

FIG. 12b

| Profile | Specification | Version | Status | UUID |
|---|---|---|---|---|
| GOEP | Generic Object Exchange Profile | 1.1 | Active | |
| GOEP | Generic Object Exchange Profile | 2.0 | Active | |
| GOEP | Generic Object Exchange Profile | 2.1 | Active | |
| GPP | Generic PIM Profile | 1.0 | Active | |
| HCRP | Hardcopy Cable Replacemant Profile | 1.0 | Active | 0x1125 |
| HCRP | Hardcopy Cable Replacemant Profile | 1.2 | Active | 0x1125 |
| HDP | Health Device Profile | 1.0 | Deprecated | 0x1400 |
| HDP | Health Device Profile | 1.1 | Active | 0x1400 |
| HFP | Hands-Free Profile | 1.5 | Active | 0x111E |
| HFP | Hands-Free Profile | 1.6 | Active | 0x111E |
| HFP | Hands-Free Profile | 1.7 | Active | 0x111E |
| HID | Human Interface Device Profile | 1.0 | Active | 0x1124 |
| HID | Human Interface Device Profile | 1.1 | Active | 0x1124 |
| HSP | Headset Profile | 1.1 | Active | 0x1108 |
| HSP | Headset Profile | 1.2 | Active | 0x1108 |
| MAP | Message Access Profile | 1.0 | Active | 0x1134 |
| MAP | Message Access Profile | 1.1 | Active | 0x1134 |
| MAP | Message Access Profile | 1.2 | Active | 0x1134 |
| MAS | Multi Profile Specification | 1.0 | Active | 0x113A |
| OPP | Object Push Profile | 1.1 | Active | 0x1105 |
| OPP | Object Push Profile | 1.2 | Active | 0x1105 |
| PAN | Personal Area Networking Profile | 1.0 | Active | 0x1115 |
| PBAP | Phone Book Access Profile | 1.0 | Active | 0x1130 |

BR/EDR Service List

FIG. 12c

| Profile | Specification | Version | Status | UUID |
|---------|---------------|---------|--------|------|
| SAP | SIM Access Profile | 1.0 | | 0x112D |
| SAP | SIM Access Profile | 1.1 | | 0x112D |
| SPP | SIerial Port Profile | 1.1 | | 0x1101 |
| SPP | SIerial Port Profile | 1.2 | | 0x1101 |
| SYNCH | Synchronization Profile | 1.1 | | 0x1104 |
| SYNCH | Synchronization Profile | 1.2 | | 0x1104 |
| VDP | Video Distribution Profile | 1.0 | | 0x1305 |
| VDP | Video Distribution Profile | 1.1 | | 0x1305 |

BR/EDR Service List

FIG. 13

|  | Organization Data(4octets) |
|---|---|
| Sample | 0b ···00000101(TBD) |
| Description | BR/EDR Interface has A2DP and HeadSet Profile |

| 8th bit | 7th bit | 6th bit | 5th bit | 4th bit | 3th bit | 2th bit | 1th bit |
|---|---|---|---|---|---|---|---|
| 0 | 0 | 0 | 0 | 0 | 1 | 0 | 1 |

Organization Data

FIG. 14

(a) Device name

| | Length(1octet) | AD type(1octet) | AD data(11octets) |
|---|---|---|---|
| Sample | 0x0C | 0x09 | 0x 52 61 73 70 62 65 72 72 79 50 69 |
| Description | Length 12octets | <<Complete Local Name>> | Raspberrypi |

(b) Device type

| | Length(1octet) | AD type(1octet) | AD data(11octets) |
|---|---|---|---|
| Sample | 0x04 | 0x0D | 0x 200418 (headphone) |
| Description | Length 4octets | <<Class of Device>> | Major Service Class<br>Major Device Class<br>Minor Device Class Filed |

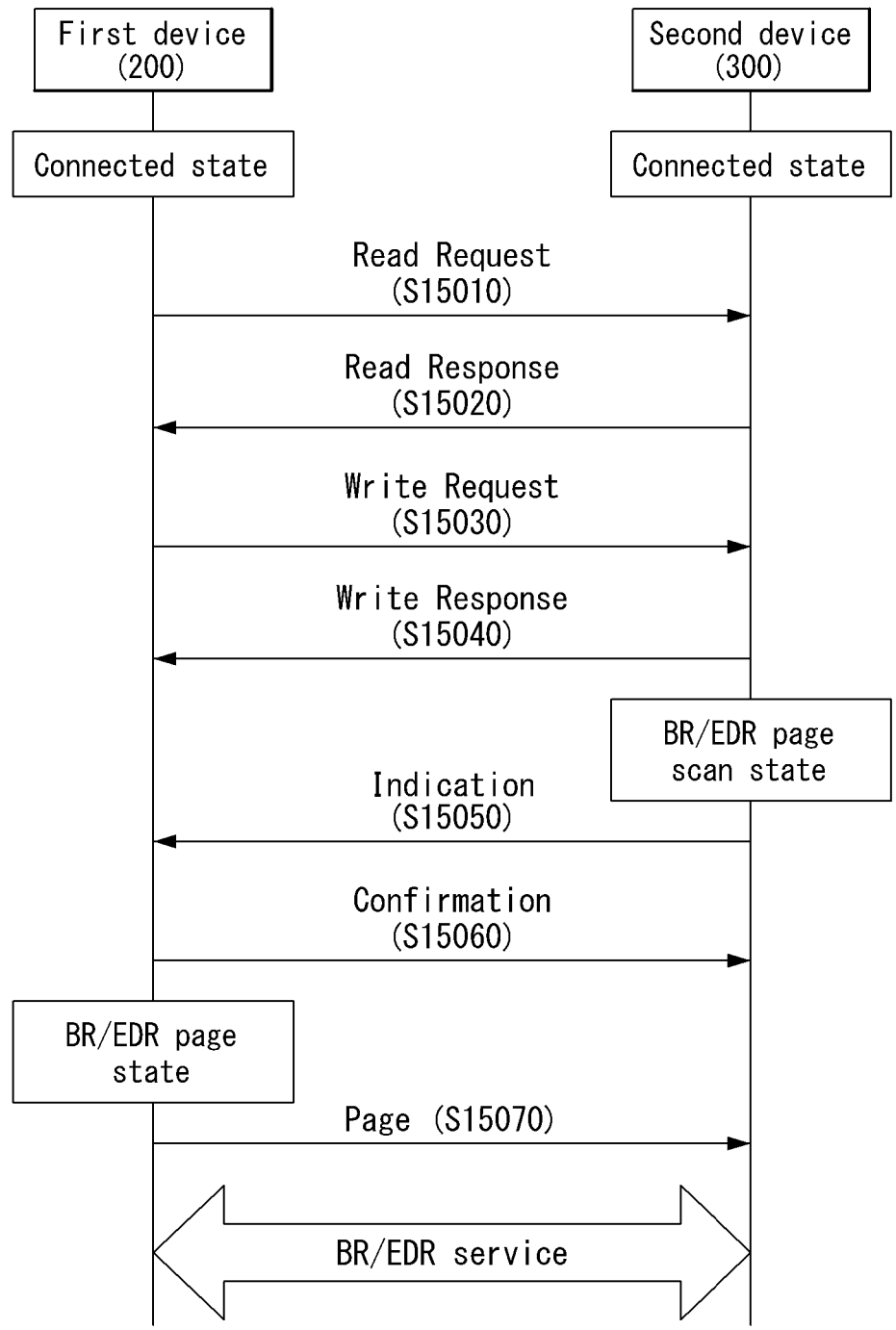

FIG. 16

| Specification Name | Specification Type | Assigned Number |
|---|---|---|
| Generic Access | org.bluetooth.service.generic_access | 0x1800 |
| Generic Attribute | org.bluetooth.service.generic_attribute | 0x1800 |
| Tx Power | org.bluetooth.service.tx_power | 0x1804 |
| Service Discovery | org.bluetooth.service.service_discovery | 0x1877(TBD) |

(a) Service

| Specification Name | Assigned Number | Properties | Interface | Parameter Example |
|---|---|---|---|---|
| Handover Control Point | 0x18a5(TBD) | Write | All | Organization Specific data up to 19byte BR/EDR A2DP and HeadSet |

(b) Characteristic

| Specification Name | Assigned Number | Properties | Interface | Parameter Example |
|---|---|---|---|---|
| BR-EDR Handover Data [BR-EDR Features (1byte)+ BD_ADDR (6byte) + Clock Offset (2 byte) + Class of Device (3byte)] | 0x18a5(TBD) | Write | All | BR-EDR Features: Reserved for Future Use BD_ADDR: 08:EF:3B:B0:11:32 Clock Offset: Ash does not think this would be useful Class of Device: Same as CoD in SCAN_RSP |

(c) Characteristic

FIG. 17

(a) Write request

| | Opcode (1octet) | Parameter (5octets) |
|---|---|---|
| Sample | 0x 01 | 0x 01 + 0x 00000001 (Profile Selector) |
| Description | Activate Alternate Transport | Bluetooth Interface Activate + Activate A2DP profile |

(b) Indication

| | Opcode (1octet) | Parameter |
|---|---|---|
| Sample | 0x 20 | Below table |
| Description | Response | Response Value |

| | Request Op Code | Result Code | Response Parameter |
|---|---|---|---|
| Sample | 0x 01 | 0x 01 | 0x00000001 |
| Description | Response of Activate Alternate Transport | Success | A2DP profile ready |

METHOD AND DEVICE FOR CONNECTING SUBSTITUTE COMMUNICATION MEANS BY USING BLUETOOTH LOW ENERGY (LE) TECHNIQUE

CROSS REFERENCE TO RELATED APPLICATIONS

This application is the National Phase of PCT International Application No. PCT/KR2015/011487, filed on Oct. 29, 2015, which claims priority under 35 U.S.C. 119(e) to U.S. Provisional Application No. 62/197,087, filed on Jul. 26, 2015, all of which are hereby expressly incorporated by reference into the present application.

TECHNICAL FIELD

The present invention relates to measuring location of a device by using Bluetooth technology which is a short range communication technology in a wireless communication system and more specifically, relates to a method and a device for connecting substitute communication means different from Bluetooth Low Energy (BLE) by using the BLE technology.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

SUMMARY OF INVENTION

Technical Problem

An object of the present invention is to provide a method for connecting a substitute communication means by using the BLE technology.

Also, an object of the present invention is to provide a method for obtaining a substitute communication means and service information by using the BLE technology and connecting the substitute communication means and activating the service.

Also, an object of the present invention is to provide a method for activating and connecting a deactivated substitute communication means by using the BLE technology.

Also, an object of the present invention is to provide a method for activating and connecting a substitute communication means by obtaining remaining time until activation of the substitute communication means by using the BLE technology.

Technical objects to be achieved by the present invention are not limited to those described above, and other technical objects not mentioned above may also be clearly understood from the descriptions given below by those skilled in the art to which the present invention belongs.

Technical Solution

To achieve the object above, the present invention provides a method for establishing a alternative communication means using the BLE technology.

More specifically, a method for establishing a alternate communication means using the Bluetooth LE (Low Energy) technology includes receiving an advertising message including alternative communication means information and service information from a second device, wherein the alternative communication means information includes information of alternative communication means supported by the second device, and the service information includes information of at least one service that the second device can provide through the at least one alternative communication means; and transmitting to the second device a write request message requesting activation of the alternative communication means and the at least one service; and receiving a response message in response to the write request message.

Also, according to the present invention, the advertising message further includes an offset value indicating a time at which the alternate communication means and the service are activated.

Also, according to the present invention, the service information further includes version information indicating the version of the service.

Also, the present invention further includes transmitting a scan request message requesting additional information of the alternative communication means and the at least one service; and receiving a scan response message including the additional information in response to the scan request message.

Also, the additional information according to the present invention includes at least one of a device class, device name, or major service class.

Also, the response message according to the present invention includes activation information indicating the activated at least one service.

Also, the activation information according to the present invention indicates activation of all or part of the services requested by the first device.

Also, the present invention provides a device including a communication unit communicating with the outside in a wireless or wired manner; and a processor functionally connected to the communication unit, wherein the processor is configured to receive an advertising message including alternative communication means information and service information from a second device, wherein the alternative communication means information includes information of alternative communication means supported by the second device, and the service information includes information of at least one service that the second device can provide through the alternative communication means; and to transmit to the second device a write request message requesting activation of the alternative communication means and the at least one service; and to receive a response message in response to the write request message.

Also, the advertising message according to the present invention further includes an offset value indicating the time at which the alternate communication means and the service are activated.

Also, the service information according to the present invention further includes version information indicating the version of the at least one service.

Also, the processor according to the present invention is configured to transmit a scan request message requesting additional information about the alternative communication means and the service; and to receive a scan response message including the additional information in response to the scan request message.

Also, the additional information according to the present invention includes at least one of a device class, device name, or major service class.

Also, the response message according to the present invention includes activation information indicating the activated at least one service.

Also, the activation information according to the present invention indicates activation of all or part of the services requested by the first device.

Advantageous Effects

According to a method for connecting a substitute communication means by using the BLE technology according to one embodiment of the present invention, a substitute communication means may be connected quickly.

Also, the present invention employs the BLE technology to obtain a substitute communication means and a service supported by a partner device, thereby performing connection of the substitute communication means and activation of the service efficiently.

Also, the present invention employs the BLE technology to connect a substitute communication means and to activate a service, the substitute communication means and the service being supported by a partner device, thereby reducing energy consumption.

The technical effects of the present invention are not limited to the technical effects described above, and other technical effects not mentioned herein may be understood to those skilled in the art from the description below.

DESCRIPTION OF DRAWINGS

FIGS. 10 to 14 illustrate one example of a flow diagram of a method for connecting a alternative communication means through the Bluetooth LE and data formats according to the present invention.

FIGS. 15 to 17 illustrate another example of a flow diagram of a method for connecting a alternative communication means through the Bluetooth LE and data formats according to the present invention.

BEST MODEL

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
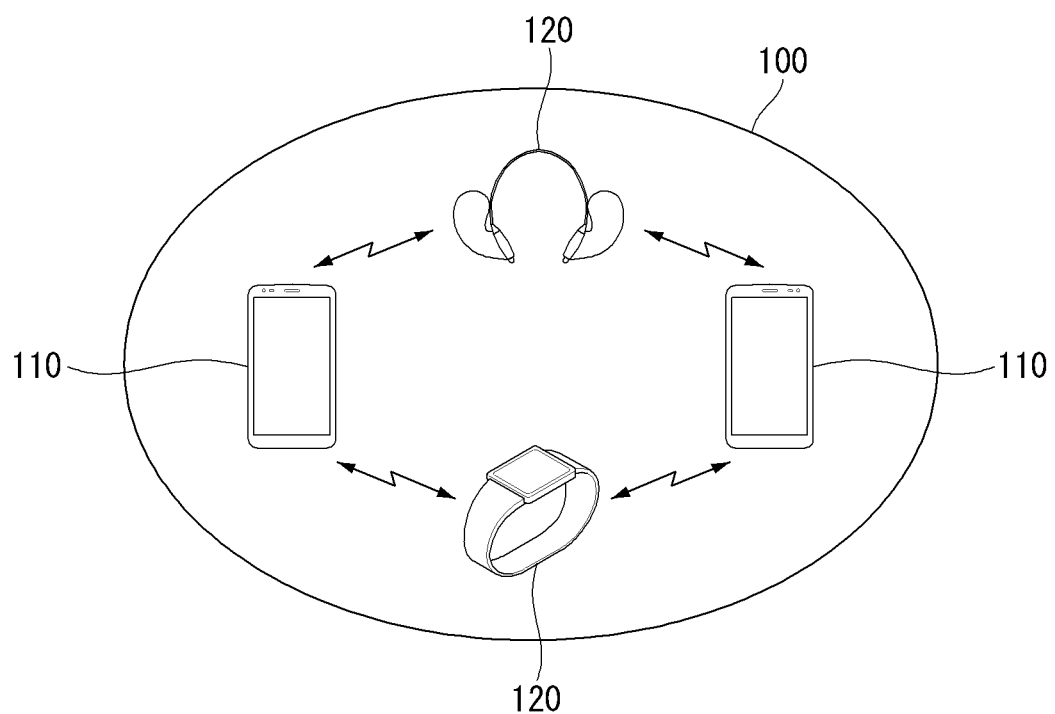
FIG. 1 is a schematic view illustrating an example of a wireless communication system using a Bluetooth low energy (BLE) technology proposed in this disclosure.

FIG. 1 is a schematic view illustrating an example of a wireless communication system using a Bluetooth low energy (BLE) technology proposed in this disclosure.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called a data service device, slave device, slave, server, conductor, host device, gateway, sensing device, monitoring device, PHD (Positioning Host Device), tag, seeker, or first device; the client device 110 may also be called a master device, master, client, member, sensor device, sink device, collector, PCD (Positioning Client Device), position estimation device, controller, locator controller, locator, provider, or second device.

The server device 120 and the client device 110 may correspond to a major component of the wireless communication system, and the wireless communication system may include a component other than the service device and the client device.

The server device 120 refers to a device which is provided with data from the client device 110 and performs direct communication with the client device 110, whereby when a data request is received from the client device 110, the server device 120 provides data to the client device 110 in response.

Also, in order to provide data information to the client device 110, the server device 120 transmits a notification message or an indication message. Also, when the service device transmits the indication message to the client device 110, the server device 120 receives a confirmation message corresponding to the indication message from the client device 110.

Also, the server device 120 may provide data information to a user through an output unit (display unit) or receive a request input from the user through an input unit (user input interface) in a process of transmitting and receiving notification, indication, and confirmation messages to and from the client device 110.

Also, the server device 120 may read data from a memory unit or write new data into the corresponding memory in a process of transmitting and receiving a message to and from the client device 110.

Also, one server device 120 may be connected to a plurality of client devices, and may be easily re-connected (or connected) with client devices by utilizing bonding information.

The client device 110 refers to a device requesting data information and data transmission from the server device.

The client device 110 receives data through a notification message, an indication message, and the like, from the server device 120, and when the indication message is received from the server device 120, the client device 110 transmits an acknowledgement message as a response to the indication message.

Similarly, the client device 110 may provide information to a user through an output unit or receive a user input through an input unit in a process of transmitting and receiving messages to and from the server device 120.

Also, the client device 110 may read data from the memory or write new data into the corresponding message in a process of transmitting and receiving a message to and from the server device 120.

Figure 2:
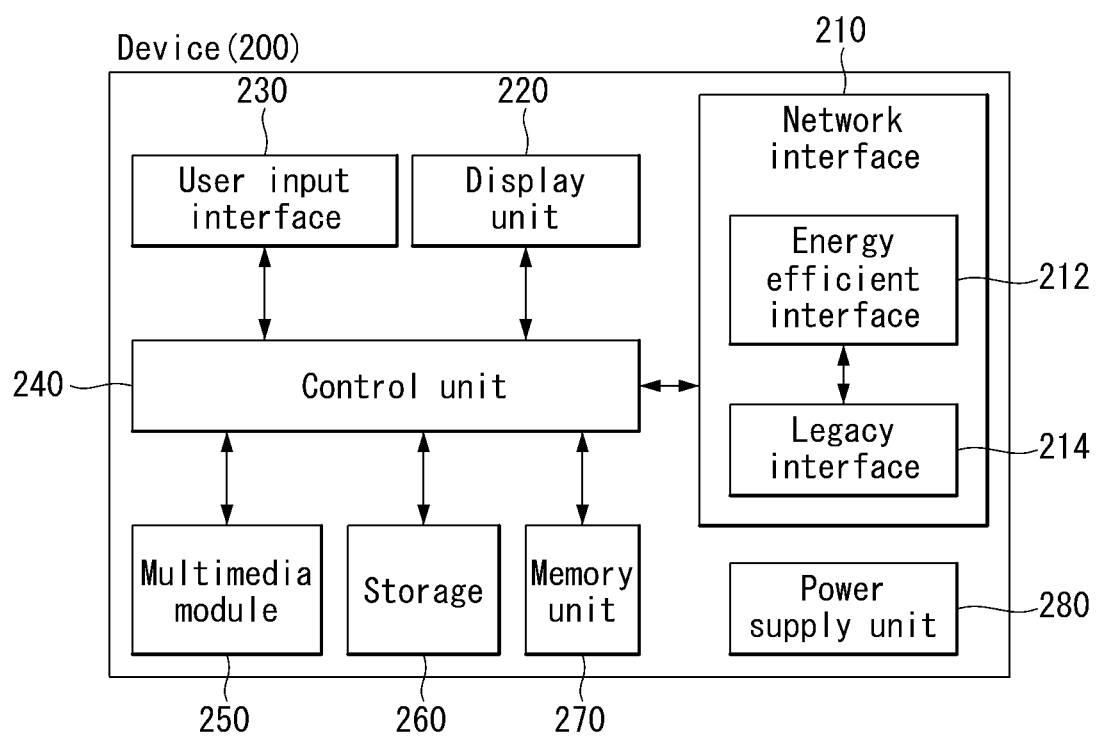
FIG. 2 is a view illustrating an example of an internal block diagram of a device capable of implementing methods proposed in this disclosure.

FIG. 2 is a view illustrating an example of an internal block diagram of a device capable of implementing methods proposed in this disclosure.

As shown in FIG. 2, a device according to the present invention may include a network interface 10, display unit 20, user input interface 30, control unit 40, multimedia module 50, storage 60, memory unit 70, and power supply unit 80.

The network interface 10, display unit 20, user input interface 30, control unit 40, multimedia module 50, storage 60, memory unit 70, and power supply unit 80 are functionally connected to each other to perform the method proposed in this document.

The network interface 10 enables the device to perform wired or wireless communication with other devices and may include an energy efficient interface 12 and a legacy interface 14.

The energy efficient interface 12 is used for low power wireless communication requiring low energy consumption, which refers to a unit (or module) that enables the device to discover other devices to connect or to perform data transmission.

The legacy interface 14 is used for wireless communication, which refers to a unit (or module) that enables the device to discover other devices to connect or to perform data transmission.

The network interface may be called a communication unit.

The display unit 20 refers to a unit (or module) displaying the data received through the network interface 10 or the data stored in the storage 60 according to the control of the control unit 40.

The control unit 40 refers to a module that controls the overall operation of the device. The control unit 40 may also be called a controller or a processor.

The control unit 40 may include ASIC (Application-Specific Integrated Circuit), other chipsets, logical circuit and/or data processing device.

The control unit 40 controls the network interface 10 to receive an advertising message from other devices, transmits a scan request message to the other devices, controls the communication unit to receive a scan response message in response to the scan request from the other devices, and controls the network interface to transmit a connect request message to the server device to establish a Bluetooth connection to the other devices.

Also, the control unit 40 controls the communication unit to read or write data through a property protocol from the other devices after a Bluetooth LE connection is formed through the connection procedure.

The multimedia module 50 is a unit (or module) for playing various types of multimedia and may be implemented inside or separately from the control unit 40.

The storage 60 is a unit implemented in various types of devices, which refers to a non-volatile unit that may store various types of data.

The memory unit 70 is a unit implemented in various types of devices, which refers to a volatile unit in which various types of data are stored temporarily.

The memory unit 60 may include ROM (Read-Only Memory), RAM (Random Access Memory), flash memory, memory card, storage medium and/or other storage devices.

The wireless communication network 10 may include a baseband circuit for processing a radio signal. When embodiments are implemented by software, the methods described above may be implemented by modules (processes or functions) that perform the functions described above. A module is stored in the memory unit 70 or storage 60 and may be executed by the processor.

The memory unit 70 may be installed inside or outside the control unit 40 and may be connected to the control unit 40 through various well-known means.

The power supply unit 80 is a module that provides power required for operation of each individual component by receiving external and internal power under the control of the control unit 40.

As described above, since the BLE technology has a small duty cycle and is capable of reducing power consumption significantly with a low-speed data rate, the power supply unit may supply power required for operating each individual component even with little output power (less than 10 mw (10 dBm)).

The user input interface 30 refers to a module that enables a user to control the operation of a device by providing the user input such as a screen button to the control unit 40.

Figure 3:
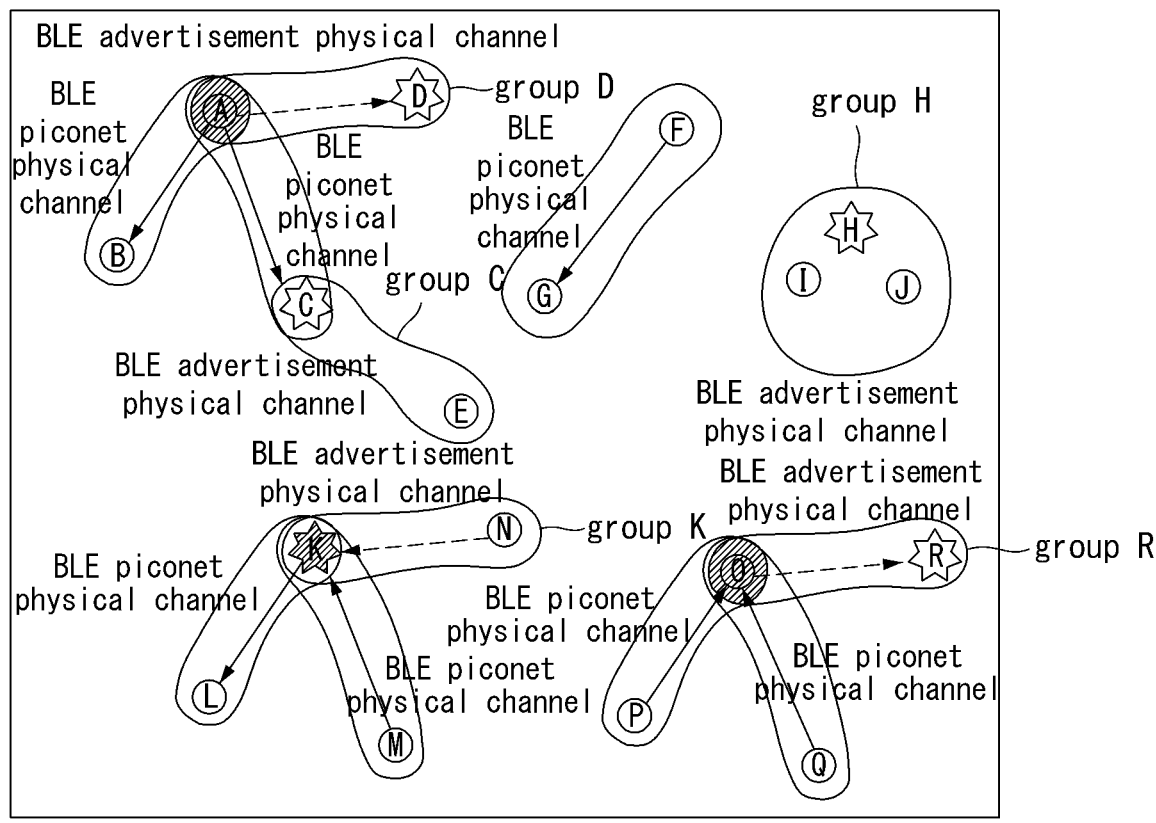
FIG. 3 is a view illustrating an example of BLE topology.

FIG. 3 is a view illustrating an example of BLE topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 3, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

Figure 4:
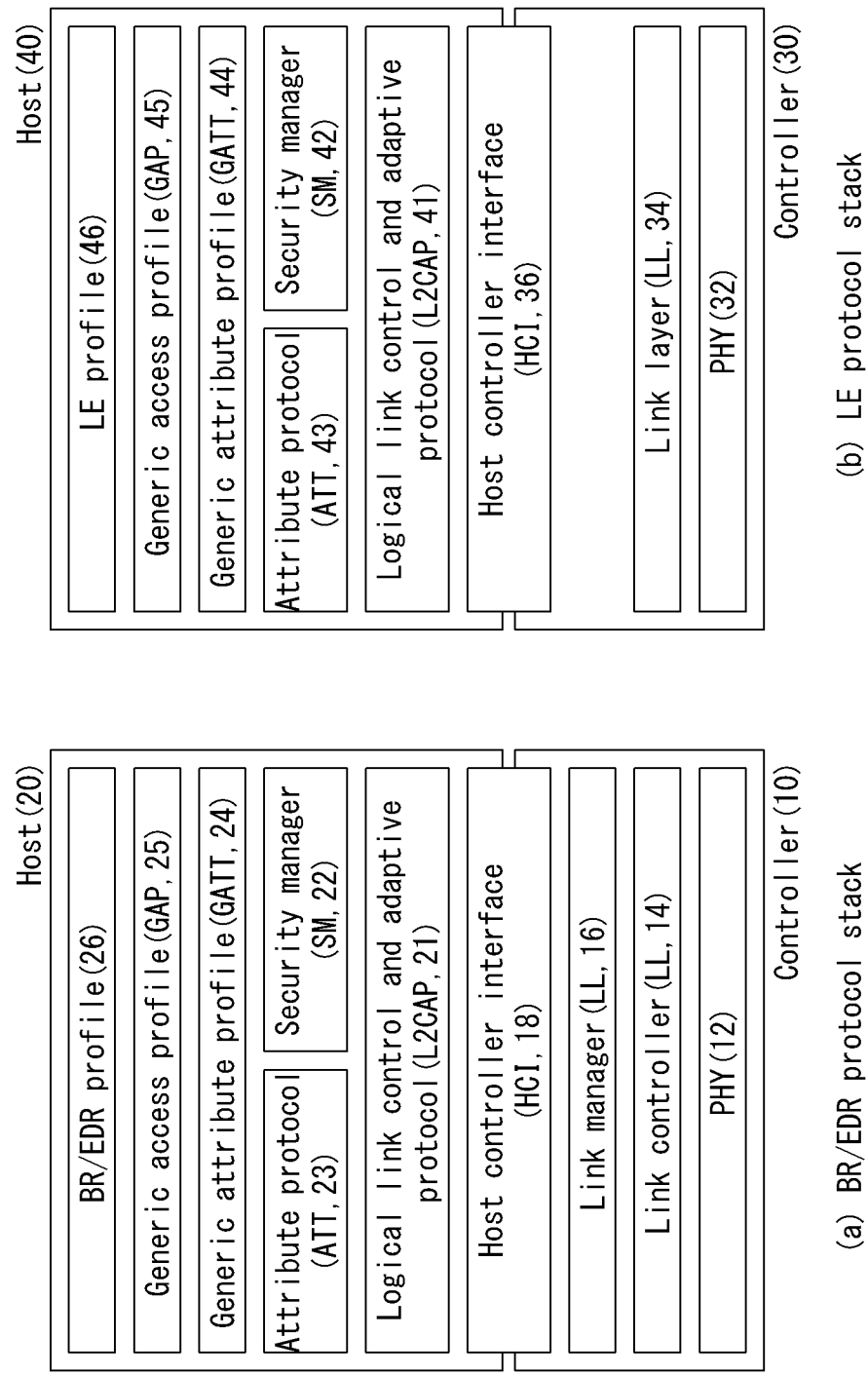
FIG. 4 is a view illustrating an example of Bluetooth communication architecture to which methods proposed in this disclosure is applicable.

FIG. 4 is a view illustrating an example of Bluetooth communication architecture to which methods proposed in this disclosure is applicable.

Referring to FIG. 4, (a) of FIG. 4 illustrates an example of a protocol stack of a Bluetooth basic rate (BR)/enhanced data rate (EDR), and (b) of FIG. 4 illustrates an example of a protocol stack of BLE.

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module 20) includes a logical link control and adaptation protocol (L2CAP, 21), a security manager (SM, 22), an attribute protocol (ATT, 23), a generic attribute profile (GATT, 24), a generic access profile (GAP, 25), and a BR/EDR profile (26).

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The security manager (SM, 22) is a protocol for authenticating a device and providing key distribution.

The generic attribute profile (GATT) 24 may operate as a protocol how the attribute protocol 23 is used in configuring services. For example, the generic attribute profile 24 may operate how ATT attributes are grouped together with services, and operate to describe features associated with services.

Thus, the GATT 24 and the ATT 23 may use features in order to describe status and services of a device and describe how the features are related and used.

The attribute protocol (ATT, 23) and profile (26) define a service (profile) using Bluetooth BR/EDR and define an application protocol for exchanging data thereof, and the generic access profile (GAP, 25) defines a scheme for discovering and connecting a device and providing information to a user, and provides privacy.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP (41) may operate to multiplex data between higher layer protocols, segment and reassemble packages, and manage transmission of multicast data.

In BLE, three fixed channels (one for a signaling channel (CH), one for a security manager, and one for an attribute protocol).

Meanwhile, BR/EDR(Basic Rate/Enhanced Data Rate) uses a dynamic channel and supports protocol service multiplexer, retransmission, streaming mode, and the like.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile (46), profiles dependent upon GATT, is mainly applied to a BLE device. The LE profile (46) may include, for example, Battery, Time, FindMe, Proximity, Time, Object Delivery Service, and the like, and details of GATT-based Profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, omnidirectional broadcast refers to broadcast in all (every) directions, rather than broadcast in a specific direction.

In contrast, directional broadcast refers to broadcast in a specific direction. Omnidirectional broadcast takes place between an advertising device and a device in a listening state (hereinafter, referred to as a "listening device").

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

In order to request additional user data from the advertising device, the scanning device transmits a scan request to the advertising device. The advertising device transmits a scan response including additional user data requested by the scanning device, as a response to the scan request, through an advertisement physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode Discovering Procedure Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier Scanning State The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device Initiating State The LL enters the initiating state according to an instruction from the host (stack).

When the LL is in the initiating state, the LL performs listening on advertising channel indices.

During the initiating state, the LL listens to an advertising channel index during the scan window interval Connection State When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in a Bluetooth interface will be briefly described. BLE devices use packets defined as follows Packet Format The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state Scanning PDU The following advertising channel DPU types are termed scanning PDUs and are used in a state described hereinafter.

SCAN_REQ: Transmitted by the LL in a scanning state and received by the LL in an advertising state.SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
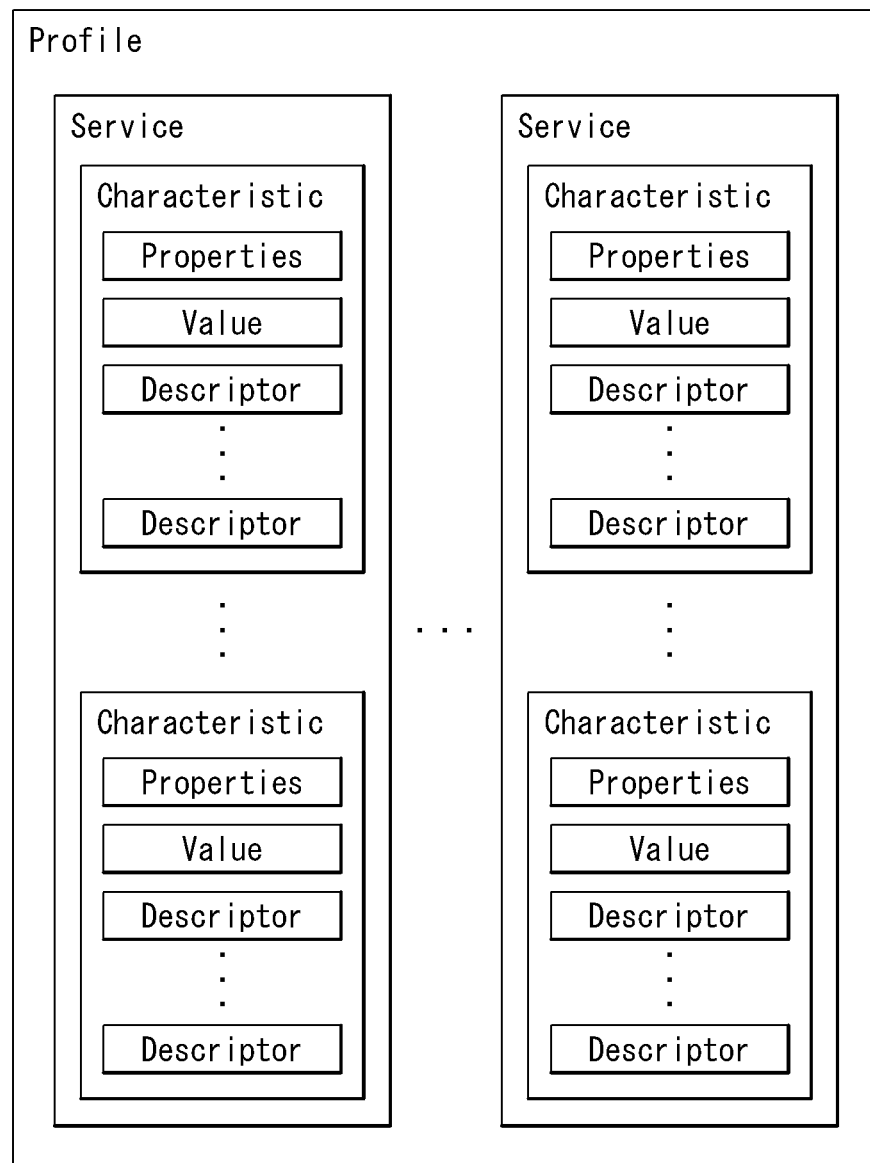
FIG. 5 is a view illustrating an example of a structure of generic attribute profile (GATT) of BLE.

FIG. 5 is a view illustrating an example of a structure of generic attribute profile (GATT) of BLE.

Referring to FIG. 5, a structure for exchanging profile data of BLE may be examined.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method for a controller to control the operation of PHD or PCD or retrieve information of the PHD or PCD by using the GATT structure of the Bluetooth LE.

Figure 6:
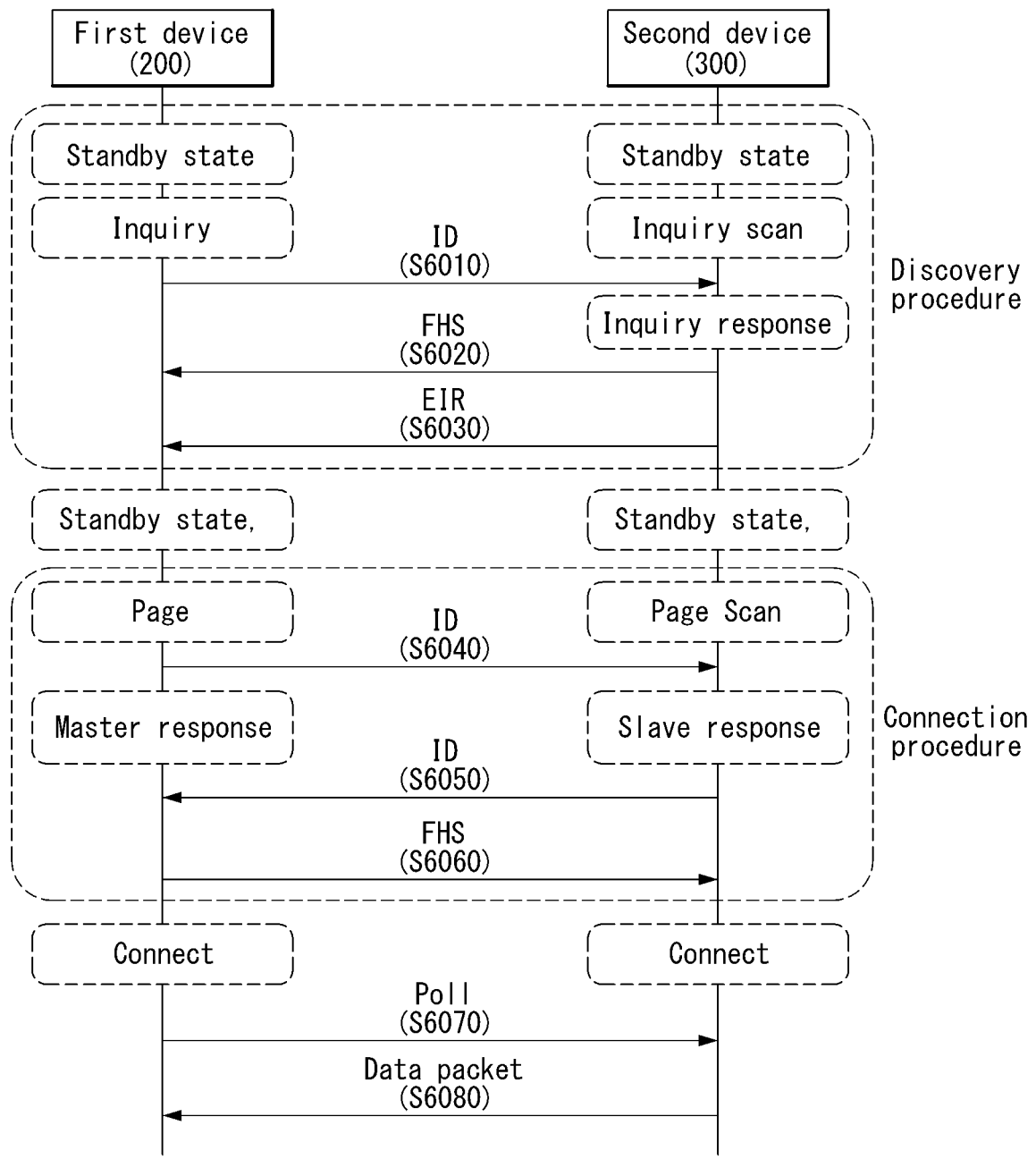
FIG. 6 illustrates a discovery and connection procedure of the Bluetooth BR/EDR.

FIG. 6 illustrates a discovery and connection procedure of the Bluetooth BR/EDR.

Discovery Procedure

After while being in the standby state, the first device 200 enters the inquiry state, and the second device 300 enters the inquiry scan state for Bluetooth BR/EDR discovery.

In the inquiry state, the first device 200 transmits an ID packet to perform Bluetooth BR/EDR discovery procedure S6010 and receives an FHS (Frequency Hop Synchronization) packet from the second device 300 in response to the transmission S6020.

If the second device 300 attempts to transmit additional information about the second device 300, the second device 300 may transmit the additional information to the first device 200 by using the EIR (Enhanced Inquiry Packet) S6030.

If the first device 200, which has confirmed existence and information of other device through the discovery procedure, attempts to connect to the second device 300, the first device 200 performs a paging procedure.

Paging Procedure

In the paging procedure, the first device 200 enters the paging state while the second device 300 enters the paging scan state.

While being in the paging state, the first device 200 transmits an ID packet to the second device 300, S6040.

When the second device 300 receives the ID packet transmitted by the first device, the first device 200 enters the BR/EDR master response state of the BR/EDR paging state, and the second device 300 enters the BR/EDR slave state of the BR/EDR paging state.

Afterwards, the first device 200 transmits the second ID packet from the channel which has transmitted the ID packet S6050.

The second device 300 which has received the second ID packet transmits an FHS (Frequency Hopping Synchronization) packet to the first device 200 for frequency synchronization S6060.

When the paging procedure is completed, the first device 200 and the second device 300 transition to the BE/EDR connected state.

Afterwards, the second device 300 transitions to a hopping pattern of the first device 200, and to check the transition, the first device 200 transmits a poll packet to the second device 300, S6070. The second device 300 which has received the poll packet transmits a data packet to the first device 200 in response to the poll packet S6080, thereby completing the Bluetooth BR/EDR connection procedure.

The procedure above is performed when devices attempt to perform wireless communication through the Bluetooth BR/EDR. However, the procedure above poses a problem that the first and the second device need to be checked in advance whether they support the Bluetooth BR/EDR, and a desired service is made available only when the devices are connected in the Bluetooth BR/EDR mode and communication is performed through the Bluetooth BR/EDR.

Therefore, to solve the problem above, the present invention provides a method for connecting devices through the Bluetooth BR/EDR by checking through the Bluetooth LE whether each device supports the Bluetooth BR/EDR and which service each device provides.

Figure 7:
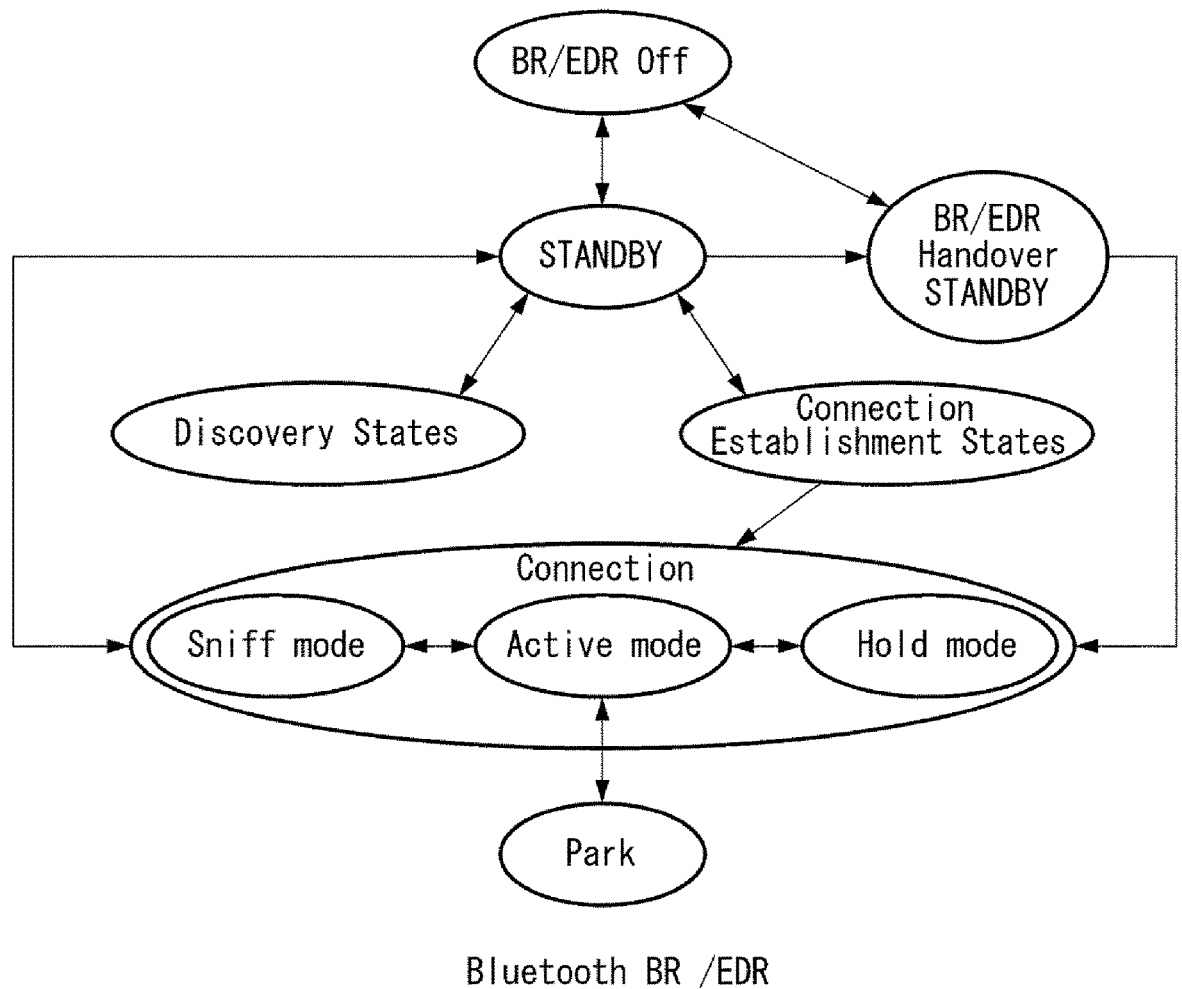
FIG. 7 illustrates one example of state transition of the Bluetooth LE and Bluetooth BR/EDR according to the present invention.

FIG. 7 illustrates one example of state transition of the Bluetooth LE and Bluetooth BR/EDR according to the present invention.

Referring to FIG. 7, by using the information obtained in the Bluetooth BR/EDR or Bluetooth LE connected state, devices may be connected through Bluetooth LE or Bluetooth BR/EDR without going into separate intermediate states.

More specifically, in the case of the conventional Bluetooth LE, no separate state is defined through which a device transitions from a non-connected state to the connection state.

In the case of Bluetooth BR/EDR, too, a device may enter the connection state from the standby state, one of the non-connected states, which requires the device to go through a separate connection establishment state or advertising state to broadcast information.

This requirement poses a problem that an unnecessary step is involved when a device exchanges information for connecting to the other interface while the device is already connected through Bluetooth LE or Bluetooth BR/EDR.

To solve the aforementioned problem, the present invention proposes a method for entering the connection state directly by defining a separate state.

More specifically, once information for handover is obtained through the Bluetooth LE connection as shown in FIG. 7(a), a device enters the BR/EDR handover standby state for establishing a Bluetooth BR/EDR connection.

From the BR/EDR handover standby state, the device may transition to the connection state without going through a separate intermediate state, for example, connection establishment state.

In FIG. 7(b), when a device obtains information for handover through the Bluetooth BR/EDR connection, the device enters the BLE handover standby state for establishing a Bluetooth LE connection.

From the BLE handover standby state, the device may enter the connection state without going through a separate intermediate state, for example, advertising state.

By using the methods of FIGS. 7(a) and (b), unnecessary procedures may be avoided when a device is connected to an interface in a non-connected state by using the information obtained through the interface already connected, and thereby handover may be performed efficiently.

Figure 8:
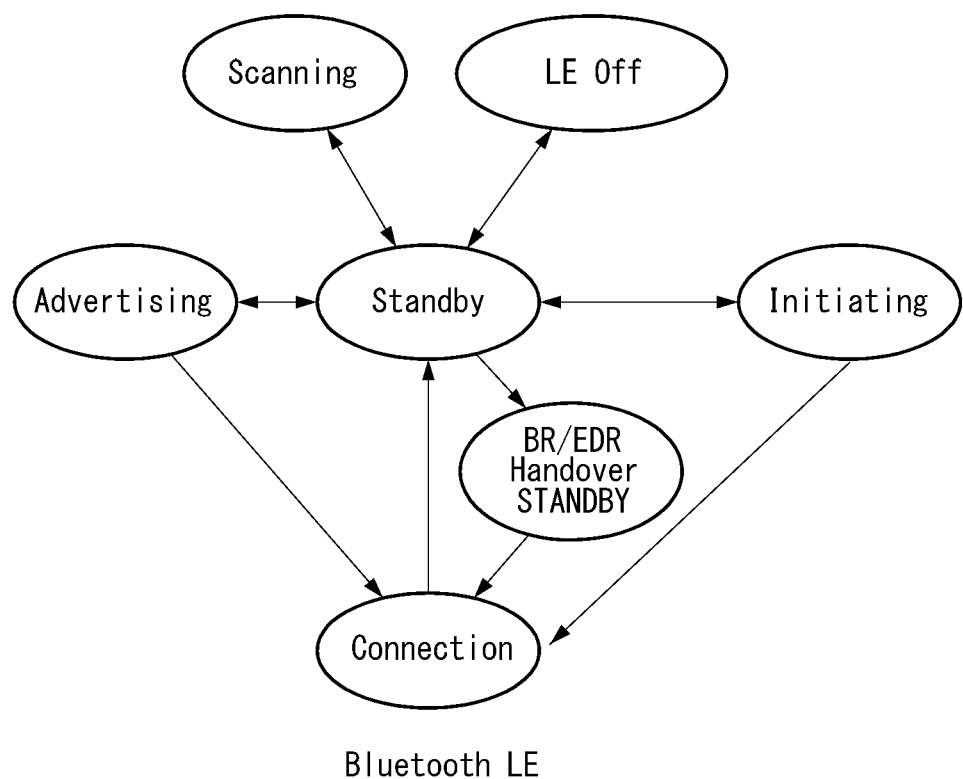
FIG. 8 illustrates one example of a method for connecting a alternative communication means through the Bluetooth LE according to the present invention.

FIG. 8 illustrates one example of a method for connecting a alternative communication means through the Bluetooth LE according to the present invention.

Referring to FIG. 8, the first device 200 may obtain information about alternative communication means (for example, Bluetooth BR/EDR and Wi-Fi direct) supported by the second device 300 through Bluetooth LE and information about services that may be provided through the alternative communication means (for example, Bluetooth BR/EDR A2DP HFP, Wi-Fi Direct Miracast, Wi-Fi Direct File Transfer).

Based on the obtained information, the first device 200 may be connected to the second device 300 through a alternative communication means and provide various services through the connected alternative communication means.

Figure 9:
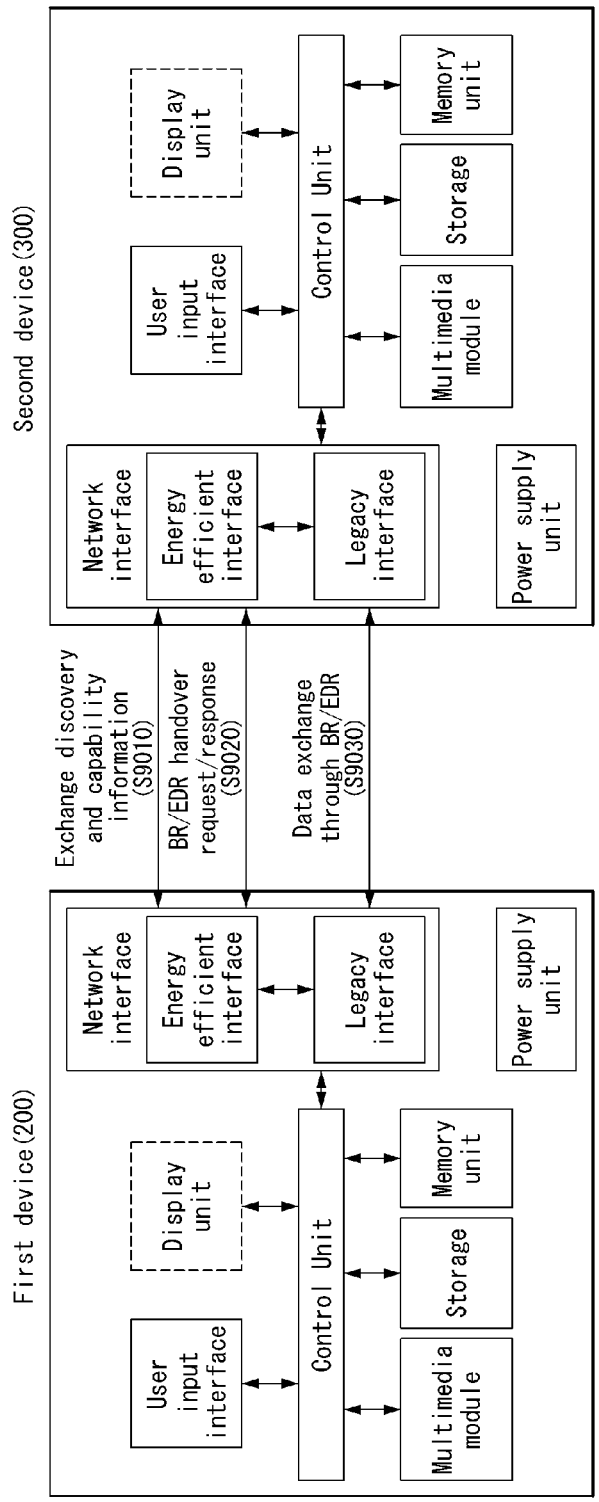
FIG. 9 illustrates one example of transmitting and receiving messages between network interfaces to connect a alternative communication means through the Bluetooth LE according to the present invention.

FIG. 9 illustrates one example of transmitting and receiving messages between network interfaces to connect a alternative communication means through the Bluetooth LE according to the present invention.

Referring to FIG. 9, the first device 200 and the second device 300 may discover their partner device through an energy efficient interface for low power wireless communication, exchange their capability information, connect a legacy interface by using the exchanged capability information, and exchange data with each other.

In what follows, the energy efficient interface is described by Bluetooth LE as an example while the legacy interface is described by Bluetooth BR/EDR.

More specifically, the first device 300 may discover the second device 300 through Bluetooth LE and exchange capability information with the second device S9010.

The capability information may include information about alternative communication technologies that each device supports (for example, Bluetooth BR/EDR, Wi-Fi, Wi-Fi Direct, and NFC) and information about services that may be provided by each alternative communication technology.

If the first device 200 and the second device 300 that have exchanged the capability information want to establish a Bluetooth BR/EDR connection, the first device 200 may transmit a handover request message requesting handover to the Bluetooth BR/EDR mode to the second device 300, and the second device 300 may transmit a handover response message to the first device 200 in response to the request S9020.

Afterwards, the first device 200 and the second device 300 connected to each other through the Bluetooth BR/EDR connection may exchange data through Bluetooth BR/EDR S9030.

By using the method described above, Bluetooth BR/EDR connection may be performed through Bluetooth LE technology exhibiting high energy efficiency.

FIGS. 10 to 14 illustrate one example of a flow diagram of a method for connecting a alternative communication means through the Bluetooth LE and data formats according to the present invention.

Referring to FIGS. 10 to 14, the first device 200 and the second device 300 may exchange information about alternative communication means that each device supports and information about services that may be provided by the alternative communication means during the Bluetooth LE connection procedure. In what follows, the aforementioned operation is described by using an example based on a method for performing a Bluetooth BR/EDR connection through Bluetooth LE.

Figure 10:
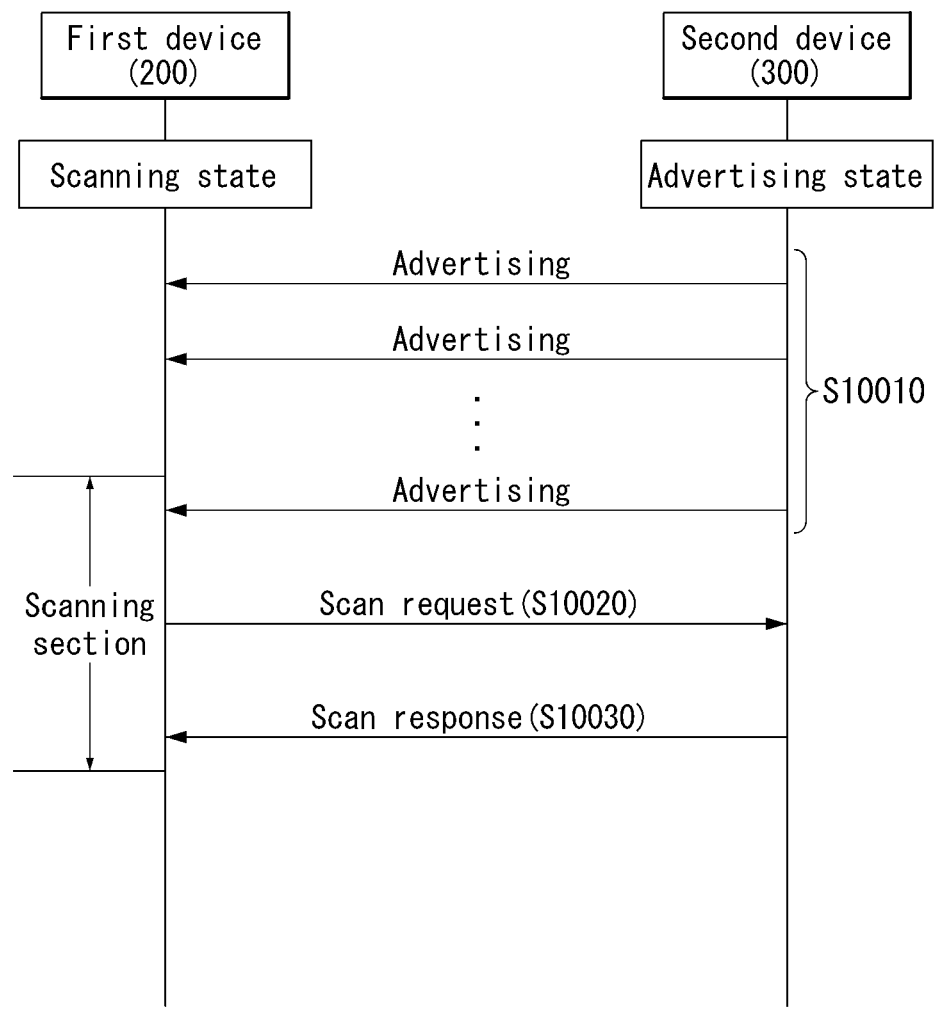

More specifically, as shown in FIG. 10, the first device 200 stays in the scanning state for establishing a Bluetooth LE connection while the second device 300 stays in the advertising state.

While being in the advertising state, the second device 300 transmits an advertising message to the first device 200, S10010. At this time, as described above, the advertising message may be transmitted to a plurality of devices through the broadcast scheme or transmitted only to a specific device through the unicast scheme.

At this time, the advertising message may include alternative communication means information representing the information of alternative communication means that the second device 300 supports and service information representing information of services that may be provided through the alternative communication means.

The service information may be included in the list information that lists a plurality of services. The alternative communication means information and the service information may be used subsequently as fundamental information for selecting a alternative communication means and a service to be activated by the first device 200 through the GATT of Bluetooth LE.

Table 2 below illustrates one example of data format of the advertising message.

TABLE 2

| Service Discovery Data AD Type Code | Ad- ditional Carriers | Carrier Frame(0 or more) | | | |
|---|---|---|---|---|---|
| | | Organization ID | SDS Flags | Length | Organization Data |
| Byte Order | N/A | N/A | N/A | N/A | N/A | LSO ... MSO |
| Data Type | Unit8 | 8 bit | Unit8 | 8 bit | Unit8 | Variable |
| Size | 1 octet | 1 octet | 1 octet | 1 octet | 1 octet | 0-25 octets |

In what follows, the data format of the advertising message will be described in more detail with reference to FIG. 11.

FIG. 11 illustrates one example of data format of the advertising message. In FIG. 11, the Service Discovery Data AD Type Code field represents the service that the second device attempts to provide through the Bluetooth LE.

The additional carrier field represents whether information of additional carriers is included in the GATT database.

FIG. 11 illustrates one example of data format of the advertising message when the second device 300 transmits the advertising message to the first device 200 by including information about Bluetooth BR/EDR support and services that may be provided through Bluetooth BR/EDR in the advertising message.

The AD type of FIG. 11 according to the present invention may have the values as shown in Table 3 below.

TABLE 3

| Type Value | Data Type Name |
|---|---|
| 0x01 | <<Flag>> |
| 0x09 | <<Complete Local Name>> |
| 0x0D | <<Class of Device>> |
| 0x2A(TBD) | <<Service Discovery Data>> |

The AD Data of FIG. 11 holds data for handover and may include Additional Carrier field and Carrier Frame field.

The bit 0 of the Additional Carrier field, which indicates that information of Bluetooth BR/EDR is included in the message, may be set to '1'.

The Carrier Frame field holds information of a alternative communication means to be connected through handover according to the Bluetooth LE and may include Organization ID field, SDS Flags field, Length field, and Organization Data field.

The Organization ID field holds the Organization ID of a alternative communication means, the SDS Flags field may hold information about the role of the corresponding device, information about device state, whether additional data exist in the GATT database, and state information of the alternative communication means.

The Organization Data field may include a service field representing service information related to the services (profile information in the case of Bluetooth BR/EDR) that may be provided through the alternative communication means and a time field representing an offset value related to the time to wait until the alternative communication means is turned on or becomes available and/or the remaining time until a service becomes unavailable. At this time, the service information may be displayed in the order of how often the services are used.

The service field may be configured by a bit field or Length Type Value (LTV) structure; when the service field is configured by the LTV structure, the service field may include list information of services of alternative communication means that the corresponding device supports and information for connection. At this time, the list information may be expressed in the form of a 16 bit UUID.

Table 4 below illustrates one example of the LTV structure of the service field.

TABLE 4

| | Length | Type | UUID |
|---|---|---|---|
| Octet Order | N/A | N/A | LSO . . . MSO |
| Data Type | unit8 | Unit8 | List of <<UUID>> |
| Size | 1 octet | 1 octet | 2 octets for each UUID listed |

When the service field has a list of a plurality of service UUIDs, priorities may be assigned to the services. For example, a service UUID close to the Least Significant Octet (LSO) may have a high priority whereas a service UUID close to the Most Significant Octet (MSO) may have a low priority.

The time field may be configured by the LTV structure, and by using the offset value included in the time field, the first device may determine when the alternative communication means and/or service of the second device becomes available.

Table 5 below illustrates one example of the LTV structure of the time field.

TABLE 5

| | Length | Type | Offset |
|---|---|---|---|
| Octet Order | N/A | N/A | N/A |
| Data Type | unit8 | uni8 | unit8 |
| Size | 1 octet | 1 octet | 1 octet |

The offset value may express time in terms of seconds, clock ticks, or other units. When the offset value is expressed in terms of seconds, and is gradually reduced to zero, the alternative communication means and/or service of the second device are made available.

The Type values of the service field and the time field are intended for distinguishing the service field from the time field, which may have the following values as shown in Table 6.

Table 6 illustrates one example of the Type values of the service field and the time field.

TABLE 6

| Value | Type |
|---|---|
| 0x00 | Reserved for Future Use |
| 0x01 | UUID |
| 0x02 | Offset |
| 0x03~0xFF | Reserved for Future Use |

FIGS. 12a to 12c illustrate one example of the profile of Bluetooth BR/EDR, and different from Bluetooth BR/EDR, services such as Wi-Fi display, FileCopy, Print, and Play may be provided in the case of Wi-Fi.

As described above, the service field may be configured by a bit field or Length Type Value (LTV) structure; when the service field is configured by the bit field, each service may be expressed by 1 bit while two octets are used to express each service in the case of LTV structure.

The UUID value of the profile shown in FIGS. 12a to 12c represents the UUID value held in the UUID field of the service field.

Also, when the version of the service is required, the service information may include version information of the service; at this time, the version information may use one octet to express the version number, or only a few bits may be allocated to express the version number.

FIG. 13 illustrates one example in which the service information is expressed by the bit field, where each bit represents a service type, and when a device is capable of supporting a service, the corresponding bit may be set to '1'.

Table 7 below illustrates one example of service types that the respective fields of the bit field represent in the base of Bluetooth BR/EDR.

TABLE 7

| Bit | Profile (Service) |
| --- | --- |
| 1st bit | A2DP |
| 2nd bit | AVRCP |
| 3rd bit | HEADSET |
| 4th bit | HFP |
| 5th bit | HDP |
| 6th bit | SPP |
| 7th bit | BIP |
| 8th bit | BPP |
| ... | ... |
| Nth bit | ... |

The first device 200 may receive an advertising message that the second device 300 has transmitted in the scanning section. The first device 200, which has obtained information about alternative communication means supported by the second device 300 and information about services that may be provided by the alternative communication means through the advertising message, may transmit a scan request message to the second device 300 if additional information is required S10020.

Afterwards, the first device 200 may receive a scan response message including additional information from the second device 200, S10030.

The additional information may include the local name, device class, device type and/or major service class of the second device.

FIG. 14 illustrates one example of additional information included in the scan response message, where FIG. 14(a) shows a local name of a device, and FIG. 14(b) illustrates one example of device type.

As described above, the first device 200 may obtain information about alternative communication means and information about services that may be provided by the alternative communication manes from the second device through the Bluetooth LE connection procedure.

FIGS. 15 to 17 illustrate another example of a flow diagram of a method for connecting a alternative communication means through the Bluetooth LE and data formats according to the present invention.

Referring to FIGS. 15 to 17, after a Bluetooth LE connection is established through the Bluetooth LE procedure described with reference to FIG. 10, the first device 200 may command the second device 300 to connect a alternative communication means through Bluetooth LE and connect the alternative communication means.

More specifically, after the procedure described with reference to FIG. 10, the first 200 and the second device 300 may be connected to each other as the first device 200 transmits a connection request message to the second device 300 and performs the Bluetooth LE connection procedure.

Afterwards, if bit3 of the SDS Flags field of the advertising message of FIG. 10 is '1' or additional information is needed, the first device 200 may issue a read request for requesting additional information to the second device S15010.

The read request is a message for requesting information stored in the GATT database of the second device 300.

FIG. 16 illustrates one example of services and characteristics stored in the GATT database of the second device 300.

FIG. 16(a) shows service types for Bluetooth BR/EDE connection through Bluetooth LE, and FIGS. 16(b) and (c) show characteristics for providing services of FIG. 16(a).

The first device 200 may receive additional information in response to the read request from the second device 300, S15020.

Afterwards, the first device 200 may issue a write request to the second device 300 to request turning on the Bluetooth BR/EDR, which is the alternative communication technology to be used to connect the two devices, and activation of the service S15030.

FIG. 17(a) illustrates one example of data format of the write request message.

The write request requests writing the Handover Control Point characteristic of the GATT database of the second device 300 shown in FIG. 16(b), and at this time, the first device 200 may request activation of all or part of the services that may be supported by the second device 300 through the write request.

The first device 200 may receive a write response in response to the write request S15040.

According to the request of the first device 300, the second device 300 turns on Bluetooth BR/EDR, which is a alternative communication means, and activates the service. At this time, the second device 300 may activate all or only part of the services requested by the first device 300.

Afterwards, the second device 300 may enter the Bluetooth BR/EDR page scan state and transmit an indication message to the first device 200, S15050.

If the request of the first device 200 is performed normally, the second device 300 may transmit the indication message to the first device as an act.

Even if the first device 200 requests activation of a plurality of services, only part of them may be activated; therefore, the indication message may include activation information representing activated services among the plurality of services.

FIG. 17(b) illustrates one example of data format of the indication message. In FIG. 17(b), the Result Code represents whether a request has been successfully performed, and the Response Parameter represents information of an activated service.

The first device transmits a confirmation message to the second device 300 in response to the indication message and enters the BR/EDR page state S15060.

Afterwards, the first device 200 transmits a page message to the second device 300 and provides a service through Bluetooth BR/EDR.

As described above, by connecting Bluetooth BR/EDR through Bluetooth LE, which is a low power communication means, power consumption may be reduced, and time required for establishing a connection may be reduced.

FIGS. 10 to 17 disclose a method for connecting Bluetooth BR/EDR through Bluetooth LE. However, the present invention is not limited to the method above and may be used to connect other alternative communication means, such as Wi-Fi, as well as Bluetooth BR/EDR.

For example, through Bluetooth LE, the second device 300 may transmit Wi-Fi and information about services that may be provided through Wi-Fi to the first device 200.

By using the disclosed method, the first device 200 may know that the second device 300 supports Wi-Fi as a alternative communication means and which services are provided through the Wi-Fi; and provide a service by connecting to the second device 300 through the Wi-Fi.

The present invention described above may be substituted, modified, and changed in various ways by those skilled in the art to which the present invention belongs without departing from technical principles of the present invention; therefore, the present invention is not limited to the embodiments described above and appended drawings.

The invention claimed is:

1. A method for establishing an alternate communication interface using Bluetooth LE (Low Energy), the method performed in a first device, and comprising:
receiving, based on a Bluetooth LE mode, an advertising message including (i) alternative communication interface information, (ii) service information and (iii) specific information related to whether additional information is located in a GATT (generic attribute profile) database from a second device,
wherein the additional information is related to (i) a plurality of alternative communication interfaces and (ii) at least one service,
wherein the alternative communication interface information includes information of the plurality of alternative communication interfaces supported by the second device, and
wherein the service information includes information of the at least one service that the second device can provide through the plurality of alternative communication interfaces;
establishing a connection with the second device via the Bluetooth LE;
transmitting, to the second device, a read request message for requesting the additional information based on the specific information when the specific information includes information on that the additional information is located in the GATT database;
receiving, from the second device, a read response message including the additional information in response to the read request message;
transmitting, to the second device, a write request message,
wherein the write request message includes an operation code for requesting writing of a specific characteristic of the second device for instructing activation of a specific alternative communication interface of the plurality of alternative communication interfaces using a GATT (generic attribute profile); and
receiving a response message in response to the write request message.

2. The method of claim 1, wherein the advertising message further includes an offset value indicating a time at which the plurality of alternate communication interfaces and the at least one service are activated.

3. The method of claim 1, wherein the service information further includes version information indicating version of the at least one service.

4. The method of claim 1, when the specific information includes information on that the additional information is not located in the GATT database, the method further comprising:
transmitting a scan request message requesting the additional information; and
receiving a scan response message including the additional information in response to the scan request message.

5. The method of claim 4, wherein the additional information includes at least one of a device class, device name, or major service class.

6. The method of claim 1, wherein the response message includes activation information indicating the activated at least one service.

7. The method of claim 6, wherein the act information indicates activation of all or part of the services requested by the first device.

8. The method of claim 1, wherein some or all of the at least one service is activated.

9. The method of claim 8, further comprising:
transmitting an indication message including activation information indicating the some or all of the at least one service.

10. A first device for establishing an alternative communication network interface by using Bluetooth Low Energy (LE), the first device comprising:
a network interface communicating with an external entity in a wireless or wired manner; and
a processor functionally connected to the network interface, wherein the processor is configured to:
receive, based on a Bluetooth LE mode, an advertising message including (i) alternative communication interface information, (ii) service information and (iii) specific information related to whether additional information is located in a GATT (generic attribute profile) database from a second device,
wherein the additional information is related to (i) a plurality of alternative communication interfaces and (ii) at least one service,
wherein the alternative communication interface information includes information of the plurality of alternative communication interfaces supported by the second device, and
wherein the service information includes information of the at least one service that the second device can provide through the plurality of alternative communication interfaces,
establish a connection with the second device via the Bluetooth LE,
transmit, to the second device, a read request message for requesting the additional information based on the specific information when the specific information includes information on that the additional information is located in the GATT database,
receive, from the second device, a read response message including the additional information in response to the read request message,
transmit, to the second device, a write request message,
wherein the write request message includes an operation code for requesting writing of a specific characteristic of the second device for instructing activation of a specific alternative communication interface of the plurality of alternative communication interfaces using a GATT (generic attribute profile), and
receive a response message in response to the write request message.

11. The first device of claim 10, wherein the advertising message further includes an offset value indicating a time at which the plurality of alternate communication interfaces and the at least one service are activated.

12. The first device of claim 10, wherein the service information further includes version information indicating version of the at least one service.

13. The first device of claim 10, wherein the processor is configured to:
when the specific information includes information on that the additional information is not located in the GATT database,
transmit a scan request message requesting the additional information; and receive a scan response message including the additional information in response to the scan request message.

14. The first device of claim 13, wherein the additional information includes at least one of a device class, device name, or major service class.

15. The first device of claim 10, wherein the response message includes activation information indicating the activated at least one service.

16. The first device of claim 15, wherein the activation information indicates activation of all or part of the services requested by the first device.

* * * * *